United States Patent [19]

Davison et al.

[11] Patent Number: 4,952,386

[45] Date of Patent: Aug. 28, 1990

[54] METHOD AND APPARATUS FOR PURIFYING HYDROGEN FLUORIDE

[75] Inventors: John B. Davison, Mission Viejo; Chung-Tseng Hsu, Laguna Hills, both of Calif.

[73] Assignee: Athens Corporation, Oceanside, Calif.

[21] Appl. No.: 196,327

[22] Filed: May 20, 1988

[51] Int. Cl.$^5$ .................. C01B 7/19; B01J 47/14; B01D 15/04

[52] U.S. Cl. .................... 423/484; 423/483; 423/DIG. 14; 210/685; 210/915

[58] Field of Search ............... 423/483, 484, DIG. 14; 210/683, 685, 686, 687, 688, 906, 915

[56] References Cited

U.S. PATENT DOCUMENTS

| | | | |
|---|---|---|---|
| 3,383,324 | 5/1968 | Hiwatashi | 252/142 |
| 3,882,018 | 5/1975 | Depree | 210/20 |
| 4,006,214 | 2/1977 | Moser et al. | 423/112 |
| 4,056,605 | 11/1977 | Vulikah et al. | 423/484 |
| 4,125,594 | 11/1978 | Su et al. | 423/488 |
| 4,144,315 | 3/1979 | Worthington et al. | 423/490 |
| 4,299,606 | 11/1981 | Robota et al. | 62/28 |
| 4,308,244 | 12/1981 | Sikdar et al. | 423/339 |
| 4,655,929 | 4/1987 | Tanaka et al. | 210/664 |
| 4,707,234 | 11/1987 | Mori et al. | 204/182.3 |
| 4,734,200 | 3/1988 | Wes Berry | 210/677 |
| 4,764,271 | 8/1988 | Acosta | 210/89 |

FOREIGN PATENT DOCUMENTS 1126232 9/1968 United Kingdom .

OTHER PUBLICATIONS

Danielsson, Lars, "Adsorption of a Number of Elements from HNO₃-HF and H₂SO₄-HF Solutions by Cation and Anion Exchange", Acta Chem. Scand. 19(1965), No. 8, pp. 1859-1874.

State Scientific Research Institute of Nonferrous Metals, Refining of Hydrofluoric Acid, Japan, Kokai Tokyo Koho 78 68, 964 as Reported in Chemical Abstracts, 90 (1979) 89502u.

Vulikh, A. I. et al., Ion-Exchange Purification of Hydrofluoric Acid, Khim., Prom-st. Moscow, 11 (1979) 672-674 as Reported in Chemical Abstracts, 98 (1983) 145930m.

Primary Examiner—Jeffrey E. Russel
Assistant Examiner—Brian M. Bolam
Attorney, Agent, or Firm—Knobbe, Martens, Olson & Bear

[57] ABSTRACT

A method for purifying hydrofluoric acid, comprising the steps of filtering the hydrofluoric acid to remove particulates, passing the filtered acid through a cation exchange material and an anion exchange material to remove ions therefrom, at least periodically automatically monitoring the acid that has passed through at least a predetermined portion of the cation exchange material for a predetermined level of cationic impurity representative of actual or impending ionic breakthrough in the cation exchange material, at least periodically automatically monitoring the acid that has passed through at least a predetermined portion of the anion exchange material for a predetermined level of anionic impurity representative of ionic breakthrough in the anion exchange material, automatically interrupting flow of acid through the anionic or cationic exchange material at or prior to the time the breakthrough in such material occurs, while the flow is interrupted, regenerating the anionic or cationic exchange material, resuming the flow after the exchange material is regenerated, passing the acid from the cationic and anionic exchange materials through an ultrafilter and into a storage container, and monitoring the level of particulate impurities in acid that has passed through the anion and cation exchange materials and automatically passing the acid in the storage container through a filter when the level of particulates exceeds a predetermined level, until the particulates are below the predetermined level. Also disclosed is an apparatus for performing the foregoing process.

20 Claims, 1 Drawing Sheet

METHOD AND APPARATUS FOR PURIFYING HYDROGEN FLUORIDE

BACKGROUND OF THE INVENTION

The present invention relates to an apparatus and method for removing ionic and particulate impurities in used hydrogen fluoride to provide purified hydrogen fluoride having impurities in the parts per billion range.

Hydrofluoric acid or hydrogen fluoride (HF) has many industrial uses related to its most notable property, the ability to dissolve silica, such as quartz and glass. Hydrogen fluoride is widely used in the semiconductor industry, for instance, in cleaning quartz diffusion tubes, in wafer cleaning, and in etching processes. Contaminants build up in the hydrogen fluoride as it is used, and when an unacceptable level of impurities is present, the HF is presently discarded.

Hydrogen fluoride is a relatively expensive material, and the raw material cost for replacing discarded or spent HF is substantial. Moreover, HF is considered to be a hazardous waste material. Accordingly, disposal of spent or contaminated HF solutions is itself a costly proposition because of the special procedures that must be followed in properly disposing of this material.

Accordingly, there is a need to reduce the HF raw material and disposal costs in manufacturing and other processes that utilize HF therein, but that require HF having a relatively high level of purity. The ability to use and reuse HF almost indefinitely is a particularly attractive proposition.

The semiconductor industry, perhaps more than any other industry, is committed to effective contamination control. The production of state of the art semiconductor devices requires strict contamination control in the environment, the equipment and the chemicals utilized therein. Semiconductor manufacturing equipment is constructed of non-contaminating materials, and often includes robotic wafer handling to minimize particulate contamination. Cleanrooms are essential to maintenance of particulate-free environments during the semiconductor fabrication process.

In addition to manufacturing equipment and environment, the third major potential source of particulate contamination in semiconductor fabrication processes is the process chemicals themselves.

Semiconductor fabrication typically involves contacting a silicon wafer with various liquids for an aggregate total of 20 or more hours. Of course, the purity of these liquids is of great concern, because ionic or particulate impurities in solutions contacting semiconductor wafers can drastically reduce yield and increase costs.

Thus, it is apparent that there is a need for an effective apparatus and method for repurifying HF to provide ultrapure HF having impurities in the parts per billion (ppb) range.

Vulikh, et al., U.S. Pat. No. 4,056,605, disclose a method for separating hydrofluoric acid from fluosilicic acid ($H_2SiF_6$), by passing HF through an anion exchange column, to obtain HF containing fluosilicic acid and sulfuric acid in concentrations no greater than 0.5% to 1% by weight. The purified HF is said to be useful in production of synthetic cryolite and aluminum fluoride.

Removal of fluosilicic acid from a mixed acid stream through use of an anion exchange resin is further disclosed by Hiwatashi, U.S. Pat. No. 3,383,324. The purified acid solution is used for pickling silicon steel sheets.

A similar disclosure is made by Hiwatashi, British Pat. No. 1,126,232.

Although the various prior art HF purification methods are effective in reducing the level of fluosilicic acid impurity and some other impurities to a sufficiently low level to permit reuse of the HF in many chemical processes, none of the prior art HF purification methods provide the ultrapure HF required by the semiconductor industry and other high technology industries.

Accordingly, it is an object of the present invention to provide a method and apparatus for purifying and regenerating HF to provide an end product having total impurities in the parts per billion (ppb) range.

Another object of the present invention is to provide a method for purifying and regenerating HF that will permit almost indefinite reuse of HF, allowance being made for minor processing losses and the need to make up for small amounts of HF actually consumed in use. Such a method would almost eliminate the substantial raw material cost of replacement HF in modern semiconductor fabrication processes.

It is a further object of the present invention to provide a method and apparatus for HF regeneration that is suitable for on-site use in semiconductor fabrication facilities for small or large scale HF purification.

A further object of the invention is to provide a method and apparatus that removes anionic impurities, cationic impurities, metallic impurities and particulate impurities from HF down to the ppb range.

Still a further object of the present invention is to provide an apparatus and method utilizing automatic controls to ensure the purity of the end product.

Other objects, features and advantages of the present invention will be apparent from the following Summary of the Invention and Detailed Description of the Invention.

SUMMARY OF THE INVENTION

Thus, in accordance with one aspect of the present invention, there is provided a method for purifying hydrofluoric acid, comprising the steps of obtaining impure hydrofluoric acid containing particulate material and at least one ionic impurity, filtering the impure hydrofluoric acid to remove the particulate material, extracting the ionic impurity by contacting the impure hydrofluoric acid with ion exchange material having an affinity for the ionic impurity to provide a purified effluent, and monitoring the hydrofluoric acid that has contacted at least a predetermined portion of the ion exchange material for the presence of the ionic impurity. In one embodiment, the extracting step comprises contacting the impure hydrofluoric acid with both an anion exchange material and a cation exchange material to remove anionic and cationic impurities. The ionic impurities will often comprise one or more of fluosilicate, phosphorous, boron, calcium, arsenic, iron, platinum, or sodium ion. In a preferred embodiment of the invention, monitoring step comprises analyzing the hydrofluoric acid with an atomic absorption analyzer. The method may further comprise the step of automatically stopping the contacting step when the monitoring step detects a predetermined level of one of the ionic impurities in the acid. In yet another preferred embodiment, the method further comprises the steps, after stopping the contacting step, of regenerating the ion exchange material, and again performing the contacting step.

In still another preferred embodiment, the ion exchange material includes cation exchange material and the regenerating step comprises contacting the cation exchange material with ultrapure sulfuric acid having metallic impurities no greater than 50 parts per billion, per metal, and preferably no greater than 30 parts per billion, per metal.

In a complimentary preferred embodiment, the ion exchange material includes anion exchange material and the regenerating step comprises contacting the anion exchange material with ultrapure ammonium hydroxide, having metallic impurities no greater than 50 parts per billion per metal, more preferably no greater than 30 parts per billion, per metal.

In other embodiments of the invention, the monitoring step may comprise analyzing for fluosilicate ion, such as by means of a conductivity sensor. Further, in an embodiment wherein the contacting step comprises passing the acid through an anion exchange material, the conductivity of the acid is measured before and after passing through at least a predetermined portion of the anion exchange material, and the contacting step is automatically stopped in response to a decrease in the difference between the measured conductivities to a predetermined value. The monitoring step may, in addition or in the alternative, comprise measuring the effluent for phosphorus, or for sodium.

In yet another preferred embodiment, the method further includes the step of contacting the acid with silicon material to remove metal ions that will deposit on the silicon.

In accordance with another aspect of the present invention, there is provided a method for purifying hydrofluoric acid, comprising the steps of filtering the hydrofluoric acid to remove particulates, passing the filtered acid through a cation exchange material and an anion exchange material to remove ions therefrom, at least periodically automatically monitoring the acid that has passed through at least a predetermined portion of the cation exchange material for a predetermined level of cationic impurity representative of actual or impending ionic breakthrough in the cation exchange material, at least periodically automatically monitoring the acid that has passed through at least a predetermined portion of the anion exchange material for a predetermined level of anionic impurity representative of ionic breakthrough in the anion exchange material, automatically interrupting flow of acid through the anionic or cationic exchange material at or prior to the time the breakthrough in such material occurs, while the flow is interrupted, regenerating the anionic or cationic exchange material, resuming the flow after the exchange material is regenerated, passing the acid from the cationic and anionic exchange materials through an ultrafilter and into a storage container, and monitoring the level of particulate impurities in acid that has passed through the anion and cation exchange materials and automatically passing the acid in the storage container through a filter when the level of particulates exceeds a predetermined level, until the particulates are below the predetermined level. This method may further comprise the step of contacting the acid with silicon material to remove metal ions that will deposit on the silicon.

In accordance with still another embodiment of the invention, there is provided a method for purifying hydrofluoric acid, comprising the steps of obtaining impure hydrofluoric acid containing particulate material and at least one ionic impurity, filtering the impure hydrofluoric acid to remove the particulate material, extracting the ionic impurity by contacting the impure hydrofluoric acid with ion exchange material having an affinity for the ionic impurity to provide a purified effluent; determining when a predetermined portion of the exchange capacity of the ion exchange material has been exhausted and automatically stopping the contacting step at that point, automatically regenerating the ion exchange material while the contacting step is stopped, and then automatically restarting the contacting step. In one embodiment of this method, the determining step comprises determining the volume of acid that has passed through the ion exchange material.

In accordance with still another aspect of the present invention, there is provided an apparatus for purifying hydrofluoric acid, comprising means for filtering particulate materials from the hydrofluoric acid, anionic exchange material and a cationic exchange material for removing ions from the hydrofluoric acid, means for contacting the hydrofluoric acid with the exchange materials, means for automatically monitoring the ion-removing capacity of the exchange materials; means for automatically interrupting contact between the exchange materials and the hydrofluoric acid when the ion-removing capacity of the exchange materials drops below a predetermined level, and means for automatically regenerating the columns when the contact is interrupted. In one embodiment of this apparatus, the means for monitoring includes an automatic absorption analyzer. In another embodiment, the means for monitoring includes sensors for measuring the conductivity of hydrofluoric acid before and after it contacts at least a predetermined portion of one of the exchange material, where the means for interrupting contact is responsive to the difference between the measured conductivities and is actuated when the difference falls below a predetermined level. The apparatus may advantageously also include a bed of silicon material, and means for passing the hydrofluoric acid over the bed to remove metal impurities having an affinity for silicon from the acid.

The apparatus may still further comprise a storage tank for receiving acid that has passed through the filter and the exchange materials, means for monitoring the level of particulate impurities in hydrofluoric acid that has passed through the exchange materials, and means for circulating the acid in the tank through a filter to remove particulate materials when the monitored level of the particulate materials exceeds a predetermined level. Finally, the apparatus may include a means for monitoring the level of particulate impurities in the acid, such as a laser particle detector.

DETAILED DESCRIPTION OF THE INVENTION

Figure 1:
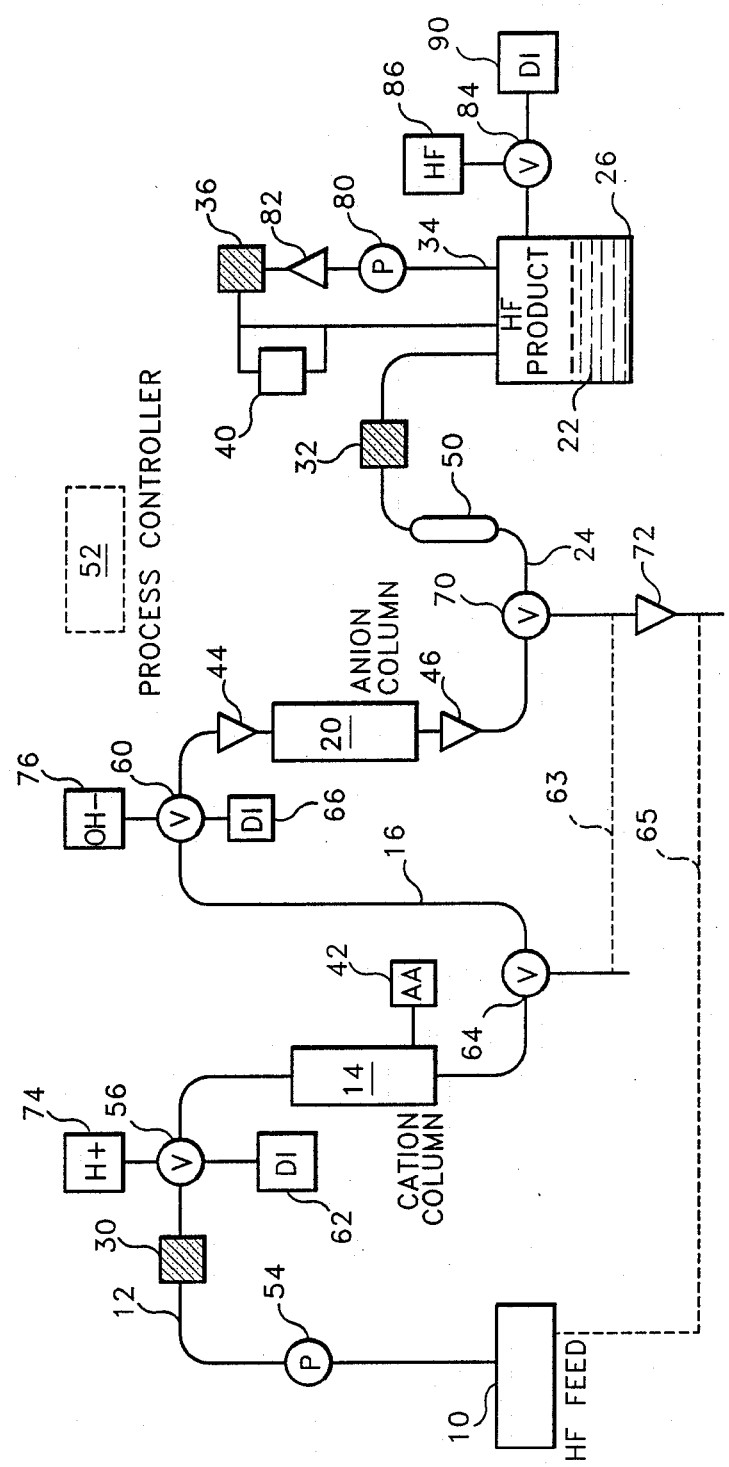
FIG. 1 is a schematic flow diagram of the HF reprocessor of the present invention.

The present invention utilizes a combination of an anion exchange resin, a cation exchange resin, ultrafiltration and automatic process control to provide levels of purity in reprocessed HF that are one or more orders of magnitude better than has heretofore been possible. One embodiment of the present invention also utilizes a "plating" process to remove metallic impurities from the reprocessed HF.

Ion exchange purification has been used for many years in water softening and chemical purification applications. Anion exchange resins in general have a low affinity for F-ions, and the prior art has evidence that some purification of HF is possible utilizing anion exchange resins.

It is, however, somewhat unusual to utilize a cation exchange resin for purification of an acid. However, because HF is a weak acid (having a $pK_a$ of 3.18 in water at 25° C.), purification of HF with a cation exchange resin is also possible.

In sharp contrast to the modest levels of purity achieved in prior art anion exchange purification of HF, we have developed a process for producing ultrapure HF with our cation and anion exchange techniques, combined with one or more filtration steps and automatic process monitoring steps.

The overall process of the present invention and the apparatus used in that process are schematically illustrated in FIG. 1. With reference to this figure, an impure HF feed solution 10 is directed through a first conduit 12 through a cation exchange column 14, then passes through a second conduit 16 and through an anion exchange column 20. The cation exchange column 14 and the anion exchange column 20 remove substantially all ionic impurities from the HF feed solution 10, and a purified HF product solution 22 is directed out of the anion exchange column 20 through a third conduit 24 and into a product tank 26.

Interposed in the conduits 12, 16, 24 are one or more filters for removing particulate materials. In the illustrated embodiment, for example, a first filter 30 is placed in the first conduit 12 upstream of the ion exchange columns 14, 20. A second filter 32 may advantageously be provided in the third conduit 24 between the ion exchange columns 14, 20 and the product tank 26.

In one preferred embodiment, a recycle loop 34 is provided for removing product 22 from the product tank 26, passing the product 22 through a third filter 36 in the recycle loop 34 and directing the filtered product back into the product tank 26. A particle counter 40 can be provided at any point in the process. In the preferred, illustrated embodiment, however, the particle counter 40 is provided in fluid communication with the recycle loop 34 to provide an indication of the total particulates in the recycle loop 34.

The particle counter 40 may be any of the commercially available particle counters. Laser particle counters are particularly suitable.

With that general overview of the process of the present invention, the process operation and control will now be described in greater detail.

Ion exchange materials perform their separation function of removing ions from solution as a result of the relative affinities of the ions in the solution for the ion exchange material itself. The separation of the ions is chromatographic in the sense that ions having a high affinity move through the ion exchange material much more slowly than those ions for which the ion exchange material has a low affinity. Eventually, however, when sufficient volumes of solvent are passed through an ion exchange material, even tightly bound ions will elute. In order to insure the highest possible purity of the end product, it is essential that the ion exchange material in the columns 14, 20 be regenerated before breakthrough of contaminating ions occurs.

Accordingly, the present invention provides for continuously monitoring the ionic content of the hydrofluoric acid passing through the columns 14, 20. The particular cation being monitored depends, of course, on the ionic content of the HF feed solution 10. Lithium and sodium are typically the "fastest" cations; accordingly, monitoring to determine where one of these ions reaches a point at or near the downstream end of the cationic exchange column 14 can provide an indication of impending or actual ionic breakthrough from the cationic exchange column 14.

Similarly, fluosilicic acid is one of the first anions to leave the anionic exchange column 20. Accordingly, detection of fluosilicic acid breakthrough can be used for purposes of process control.

In hydrofluoric acid that has been used in semiconductor fabrication processes, fluosilicate is typically the most prevalent ionic impurity. (Fluosilicate is formed from the reaction of HF with glass, quartz, or other silica material.) Other impurities that are may be found in used HF solutions include phosphorous, boron, calcium, arsenic, iron, platinum, aluminum, copper, gold, and sodium.

In one preferred embodiment of the present invention, either the cation exchange column 14, the anion exchange column 20, or both columns 14, 20, are monitored for ionic breakthrough. Where the ionic impurities are known, the volume of solution that will pass through the column before ionic breakthrough occurs can be readily determined by one of ordinary skill in the art for any given combination of HF concentration ion, ion exchange material, and column length. It is preferred that the length of the columns 14, 20 and the cation and anion exchange materials used therein be selected so that ionic breakthrough occurs at or near the same volume of acid treated for each column.

The step of monitoring the process for impending ionic breakthrough from the columns 14, 20 may simply comprise the step of measuring the volume of HF solution that has passed through the column. The process may be automatically programmed to stop the flow of HF solution through the columns 14, 20 when a predetermined volume of liquid has been passed through the column. That predetermined volume preferably is equal to or slightly less than the volume required to cause ionic breakthrough.

Alternatively, the columns 14, 20 may be monitored in real time for actual or impending ionic breakthrough by measuring the concentration of a desired ion at or near the outlet of the column 14, 20.

In one preferred embodiment of the present invention, a cation monitor 42 is provided for measuring the concentration of one or more cations of interest in the HF solution that has passed through at least a predetermined portion of the cationic exchange material in the cationic exchange column 14. The cation monitor 42 may be situated in the second conduit 16 between the cationic exchange column and the anionic exchange column, where it can detect actual ionic breakthrough of a cation of interest, such as sodium. Alternatively, as illustrated in FIG. 1, the cation monitor 42 may monitor HF solution that has passed through only a predetermined portion of the cation exchange column 14. In this embodiment, the cation monitor 42 is preferably situated just before the downstream end of the cation exchange material, so that a signal indicative of impending ionic breakthrough is generated only when most of the capacity of the cation exchange material has been exhausted.

Although any of the known analytical devices suitable for monitoring the cation of interest may be used, it is preferred that the cation monitor have a sensitivity for the cation in the ppb range. One particularly suitable type of cation monitor is an atomic absorption spectrometer. Where an atomic absorption monitor is used, it is preferably provided with an autosampler of known design so that samples of HF solution are continuously being drawn and monitored.

In a similar manner, the preferred embodiment of the invention includes an anion monitor for determining actual or impending anionic breakthrough in connection with the anionic exchange column 20. As with the cation monitor 42, any suitable instrumentation for detecting anionic breakthrough may be used. In the illustrated embodiment, however, the anion monitor comprises a first conductivity sensor 44 and a second conductivity sensor 46. Such conductivity sensors may be used to monitor for the presence of any conductive ion; however, they are particularly suitable for monitoring for the presence of fluosilicic acid, which is a strong acid. Although the fluosilicic acid level in the HF solution upstream of the anion exchange column 20 will generally be very small (on the order of 1% of the total concentration of HF), it is nonetheless detectable by a pair of conductivity sensors capable of measuring concentrations in the millimho range. For instance, we have determined that, in a 5% (w/v) HF solution, each addition of 0.01% (w/v) of fluosilicic acid increases the conductivity of the solution by approximately 300 $\mu$mhos, in a linear fashion.

The conductivity sensors used in the present invention preferably have millimho sensitivity, and more preferably are sensitive in the $\mu$mho range. Furthermore, if the process stream is not maintained at a constant temperature, it is preferred that temperature compensation for the conductivity sensors be provided.

The illustrated embodiment shows conductivity sensors 44, 46 situated on either side of the cationic exchange column 14. Alternatively, the conductivity sensors 44, 46 may be situated so that less than all of the anionic exchange material in the anionic exchange column 20 is between the sensors. Thus, the first conductivity sensor 44 may be situated in the second conduit 16 between the columns 14, 20, and the second (downstream) conductivity sensor 46 may be situated to measure the conductivity of HF solution that has passed through most, but not all, of the length of the anionic exchange column 20. This type of conductivity sensor arrangement will give an indication of impending ionic breakthrough.

Regardless of the exact placement of the conductivity sensors 44, 46, the principle upon which they operate in the apparatus of the present invention relates to comparison of conductivities rather than absolute conductivity measurements. Prior to ionic breakthrough (or prior to the time fluosilicate or other measured ion reaches the second conductivity sensor 46) the conductivity measured by the first conductivity sensor 44 will always be higher than the conductivity measured by the second conductivity sensor 46, due to the presence of the measured ion at the first conductivity sensor 44 and the absence of that ion at the second conductivity sensor 46. However, when the measured ion reaches the second conductivity sensor 46, the measured conductivities will approach the same value. (The values may not be identical, because other conductive ions may not have yet reached the second conductivity sensor 46.) For any particular type of HF solution being purified, a predetermined conductivity difference indicative of an ion front reaching the second conductivity sensor can be mathematically or empirically determined. By monitoring the ratio of or difference between the measured conductivities (as with a comparator), a signal indicative of actual or impending ionic breakthrough can be generated.

Of course, it will be apparent to those skilled in the art that the columns 14, 20 can be sized so that for any given impure HF feed solution 10, ionic breakthrough will occur (for one ion) in one of the columns 14, 20 prior to the time it occurs (for another, oppositely-charged ion) in the other column. In this situation, only that one column need be monitored for ionic breakthrough.

A wide variety of anion exchange resins and cation exchange resins may be used in the process of the present invention. Generally, though, a strong acid cation exchanger and a weak base anion exchanger are preferred. Preferred cation exchange resins are sulfonic acidfunctionalized polystyrene/divinyl benzene copolymers. Suitable resins are produced by the Dow Chemical Company under the trade names DOWEX HGR-W2, DOWEX G-23, and DOWEX M-32; by Bio-Rad Corporation under the trade designation Biorad AG50WX12, by Bayer Chemical Company under the trade designation Lewatit S-100, and by Rohm & Haas Company under the trade designation Amberlite IR-118. The anion exchange resin may be a weak base anion exchange styrene/divinyl benzene copolymer such as DOWEX M-43 and Biorad AGW-X4A (which have tertiary amine functionalities). Amberlite 900 is a strong base styrene/divinyl benzene copolymer quaternary amine anion exchange resin that may be used in the present invention. Lewatit MP-62, another suitable anion exchange resin, is a weak base anion exchanger of cross-linked polystyrene (presumably also a styrene/divinyl benzene copolymer). This resin has only tertiary amine functionalities.

In another preferred embodiment of the invention, a final "polishing" column 50 is provided. This polishing column 50 is preferably situated downstream of both of the anionic and cationic exchange columns 14, 20, and is packed with silicon. Pure silicon, whether amorphous or crystalline, has the ability to remove metallic ions such as copper, platinum and gold from solution. These metallic ions actually "plate out" on the silicon. Thus, the polishing column 50 may be packed with pieces of single crystal silicon wafers, chips of polysilicon, polysilicon spheres formed in a fluidized bed reactor, or other silicon material. The particular type of silicon used does not appear to be of importance. What is important is that the silicon be pure and generally free of particulates.

The entire HF purification process is preferably under automatic control. This automatic control may be provided by a process controller 52, schematically represented in FIG. 1. The process controller 52 can be any of the known, commercially available process controllers, or alternatively it may comprise a programmed general purpose computer. At the initiation of the process, for example, the process controller 52 may actuate a first pump 54 situated in the first conduit 12 to move HF feed 10 through the first conduit 12 and on through the process equipment into the product tank 26. When the process controller 52 determines that the capacity of one or more of the columns 14, 20 is substantially exhausted (e.g., by monitoring signals from the cation monitor 42, the first and second conductivity sensors 44, 46, or by monitoring the volume of liquid that has passed through the system), the process controller 52 deenergizes pump 54 and initiates a column regeneration cycle. In the column regeneration cycle, the flow of HF solution through the columns is halted and ultrapure regeneration solutions are instead passed through the columns 14, 20, and out of the apparatus.

We have discovered that ultrapure HF can be produced by ion exchange only by use of ion exchange columns 14, 20 that have been specially treated (regenerated) with ultrapure reagents. To the best of our knowledge, no commercially available ion exchange materials can be used to produce ultrahigh purity HF without pretreatment with an ultrapure acid or base.

The type of regenerating reagent suitable for use with any particular ion exchange material can be determined by consulting the manufacturer or by consulting standard reference materials. In the present process, the preferred acid for regenerating the cationic exchange material is ultrapure sulfuric acid, having metallic impurities no greater than fifty parts per billion, per metal. In a particularly preferred embodiment, the sulfuric acid used in the regeneration step contains no greater than thirty parts per billion metallic impurities per metal. Such ultrapure sulfuric acid is commercially available, or it can be generated on site. An on-site sulfuric acid reprocessor for generating such ultrapure sulfuric acid is available from Athens Corporation, Oceanside, Calif., and is marketed under the trademark PIRANHA PIRANHA REPROCESSOR.

The base that can be used for regenerating the anionic exchange column 20 may be any appropriate base. However, it also should be ultrapure, and should have levels of metallic impurities less than fifty parts per billion, per metal, and preferably less than thirty parts per billion, per metal. A particularly preferred regeneration solution comprises ultrapure ammonium hydroxide (5% by weight).

In the regeneration step, the process controller 52 not only shuts off the pump 54, it also actuates a first valve 56 in the first conduit& 12 upstream from the cationic exchange column 14 to shut off the flow of HF feed solution 10 through the cationic exchange column 14. Similarly, the process controller 52 actuates a second valve 60 situated in the second conduit 16 upstream of the anionic exchange column 20 to stop the flow of HF feed solution 10 through the anionic exchange column 20.

Once the flow of HF through the system is halted, the valve 56 is actuated by the process controller 52 to direct deionized (DI) water from a first DI water source 62 through the valve 56 and the cation exchange column 14 to rinse out and replace HF left in the cation exchange column 14. The HF and DI water leaving the cation exchange column 14 is directed out through a third valve 64 in the second conduit 16. The HF exiting through the third valve 64 may be saved by returning it to the HF feed 10, as indicated by the dotted line 63, 65.

Similarly, DI water from a second DI water source 66 is directed by the second valve 60 through the anion exchange column 20, and out through a fourth valve 70 downstream of the anion exchange column 20 in the third conduit 24. The HF exiting through the fourth valve 70 may likewise be saved by returning it to the HF feed 10, as indicated by the dotted line 65. A third conductivity sensor 72 interposed in the flow of liquid exiting the third valve 64 and/or the fourth valve 70 may be used to advantage to sense when HF is in the effluent wash stream in sufficient quantity to warrant recirculation thereof to the HF feed 10 reservoir.

After this initial flushing or washing step, the process controller 52 then directs ultrapure acid from a regeneration acid reservoir 74 through the valve 56 and through the cationic exchange column 14 until regeneration is complete. The third valve 64 just downstream of the cationic exchange column 14 is actuated by the process controller 52 to direct regeneration acid leaving the cationic exchange column 14 into a waste receptacle (not shown), a sulfuric acid reprocessor (not shown), or into any other appropriate area. In a similar manner, the processor controller direct s regeneration base from a regeneration base reservoir 76 through the second valve 60 and thence through the anion exchange column 20. The regeneration base leaving the anion exchange column 20 is directed through the fourth valve 70 just downstream of the anion exchange column 20. The fourth valve 70 directs the regeneration base 76 from the anion exchange column 20 into a waste reservoir, a reprocessor, or other suitable area.

Once the regeneration of the columns 14, 20 is complete, the process controller 52 toggles the valves 56, 60 to shut off the flow of acid and base, respectively, and to direct DI water from the first and second DI water sources 62, 66 through the cation exchange column 14 and the anion exchange column 20, respectively. The DI water flow through the columns 14, 20 continues until all traces of the regenerating acid and base are removed from the columns. The DI water is removed from the system through the third and fourth valves 64, 70. The third conductivity sensor 72 in the effluent stream of DI water can be used to monitor the acid and/or base concentration of the DI water and, if appropriate, to shift (under control of the process controller 52) the DI water from a waste receptacle to a municipal sewer when the concentration of acid or base therein drops below a predetermined level.

Once the purified HF product 22 reaches the product tank 26, a second pump 80 is periodically energized by the process controller 52 to circulate HF product 22 through the recycle loop 34. If desired, a fourth conductivity sensor 82 may be interposed in the recycle loop 34 to determine the concentration of HF in the product tank 26. Because the HF in the product tank is intended for reuse, it is important that it be at the proper concentration. With all competing impurities removed, the concentration of the HF in the product tank 26 is directly related to the conductivity of the HF product solution 22. We have determined that HF conductivity as a function of the HF concentration in an aqueous solution is linear between 0 and about 10%, and the literature further indicates that conductivity of aqueous HF solutions is linear up to at least 28%.

The conductivity data from the fourth conductivity sensor are utilized by the process controller 52 to control a fifth valve 84 to introduce into the product tank 26 an appropriate quantity of liquid from either concentrated HF from an HF makeup reservoir 86 or DI water from a DI water source 90.

It should be emphasized that the placement of the various filters 30, 32, 36 is largely a matter of choice. It is preferable, however, to have at least one filter upstream of the columns 14, 20. This first filter 30 is intended to remove relatively large particles, such as quartz particles that entered the acid in cleaning operations. The first filter 30 may advantageously have a pore size, for example, in the range of 1 $\mu$ to 20 $\mu$.

Additional filters are provided for removing progressively smaller particles. The second filter 32, located downstream of the anion exchange column 20, may advantageously have a pore size of from 0.5 μ to 5 μ.

For final product treatment, an ultrafilter may be desirable, such as the third filter 36. This ultrafilter may, for example, have a pore size of 0.5 μ or less, preferably 0.2 μ or less.

EXAMPLE 1

HF Purification

In this experiment, fresh batches of ion exchange resins were used. After being loaded on the column 14, the cation resin, 1.3 gallons of Dowex M-32 (Dow Chemical Co.), was treated with 10.8 bed volumes (14 gallons) of ultrapure 13 wt % sulfuric acid flowing at about 2 gallons per hour. Then the sulfuric acid was rinsed from the column with 25 bed volumes (32.5 gallons) of DI water. The anion resin, 1.8 gallons of Lewatit MP-62, was treated with 1.6 bed volumes (2.8 gallons) of ultrapure 5 wt % ammonium hydroxide solution prepared by bubbling high purity anhydrous ammonia into DI water in a fluoropolymer reaction apparatus. The ammonium hydroxide flow rate into the anion column 20 was 2 gallons per hour. The anion column 20 was then rinsed with 11 bed volumes (20 gallons) of DI water. Experience has shown that these conditions are sufficient to "clean up" fresh cation and anion resin.

The acid used in this experiment was 5 gallons of 14 wt % HF that had been used to clean one phosphorus diffusion tube in a semiconductor facility. The acid contained approximately 2000 particles/ml greater than 0.5 microns in size as determined using a PMS tank sampler laser particle counter 40. (IMOLV-HF/uLPs-16 from Particle Measuring Systems, Inc., 1855 South 57th Court, Boulder, Colo. 80301) The fluosilicic acid content of the HF was found by titration to be 0.056 wt %. The levels of 30 other impurities, most notably phosphorus, were determined by ICP/MS, as set forth in Table 1.

The HF was pumped from the feed tank at a rate of 0.2 gallons per minute. The acid passed through (a) the first filter 30 (5 micron POLYGARD from Millipore), (b) the 4" dia.×36"h cation column 14, (c) the 4" dia.×36"h anion column 20, (d) the second filter 32 (1 micron polycarbonate QR filter from Nuclepore), and (e) into the product tank 26.

Once all 5 gallons of HF were received in the product tank 26, the first pump 54 was shut off and the second pump 80 on the product tank 26 was turned on. The HF in the product tank 26 was pumped at a rate of about 1 gallon per minute through the third filter 36 (0.2 micron polycarbonate QR filter from Nuclepore) through the recycle loop 34 and back into the product tank. Downstream from the third filter 36, a slipstream of filtered HF was passed through the laser particle monitor 40 at a rate of 25 ml/min. Particle data were collected every minute. A large number of particles/ml ≧0.5 micron were detected in the first five minutes after the pump on the product tank was turned on. After that time, the number of particles ≧0.5 micron/ml averaged about 0.4.

The ICP/MS analysis of the acid leaving filter 36 appears in Table 1. The total level of detected impurities for the thirty elements analyzed is about 30 ppb. The fluosilicic acid level in the treated acid was below the detection limit of the titration method, 0.001 wt %.

TABLE I

| ICP/MS ANALYSIS OF PHOSPHORUS TUBE HF | | |
|---|---|---|
| Element | Before (PPB) | After (PPB) |
| Al | 120.0 | 4.5 |
| Ag | <0.1 | <0.1 |
| As | 0.1 | <0.1 |
| Au | <0.2 | <0.2 |
| B | 88.0 | 20.0 |
| Ba | 0.2 | 0.1 |
| Be | <0.1 | <0.1 |
| Ca | 12.0 | <2.0 |
| Cd | 0.7 | <0.1 |
| Co | <0.1 | <0.1 |
| Cr | 2.2 | 0.1 |
| Cu | 0.6 | 0.3 |
| Fe | 25.0 | <5.0 |
| Ga | <0.1 | <0.1 |
| Ge | 0.4 | <0.1 |
| K | 6.0 | <2.0 |
| Li | 0.2 | <0.1 |
| Mg | 9.4 | 1.6 |
| Mn | 1.7 | <0.1 |
| Mo | 21.0 | <1.0 |
| Na | 12.3 | 4.0 |
| Ni | 2.6 | 0.3 |
| P | 3,290.0 | <60.0 |
| Pb | 4.2 | 0.1 |
| Sc | 0.8 | <0.5 |
| Se | <0.3 | <0.3 |
| Sn | 0.3 | <0.1 |
| Sr | 0.3 | <0.1 |
| W | <0.2 | <0.2 |
| V | <0.2 | <0.2 |
| Zn | <1.0 | <1.0 |
| Zr | 3.3 | <0.1 |

During the time the acid was being pumped from the feed tank to the product tank 26, an on-line AA 40 was monitoring a slipstream from the cation column 14 for sodium ion concentration. The data indicated that no sodium ion breakthrough on the cation column 14 had occurred. At the same time, first and second conductivity sensors 44, 46 were monitoring the conductivity of the HF solution entering and leaving the anion exchange column 20. The data indicated that no fluosilicic acid breakthrough on the anion column 20 had occurred.

What is claimed is:

1. A method for purifying hydrofluoric acid, comprising the steps of:
   obtaining impure hydrofluoric acid containing particulate material and anionic and cationic impurities;
   filtering the impure hydrofluoric acid to remove said particulate material;
   extracting said ionic impurities by contacting said impure hydrofluoric acid with anion and cation ion exchange material having an affinity for said ionic impurities to provide a purified effluent, wherein said anion and cation ion exchange material is in separate beds and flow through the beds is sequential;
   monitoring the hydrofluoric acid that has contacted at least a portion of said ion exchange material for the presence of an ionic impurity;
   automatically stopping the contacting step when said monitoring step indicates an elevated level of said ionic impurity representative of exhaustion of at least a portion of said ion exchange materials; and
   automatically regenerating said cation exchange material with an ultrapure strong acid having metallic impurities no greater than 50 parts per billion per metal and automatically regenerating said anion exchange material with an ultrapure strong base having metallic impurities no greater than 50 parts per billion per metal.

2. The method of claim 1, wherein said ionic impurities include one or more of fluosilicate, phosphorous, boron, calcium, arsenic, iron, platinum and sodium ion.

3. A method for purifying hydrofluoric acid, comprising the steps of:
   obtaining impure hydrofluoric acid containing particulate material and anionic and cationic impurities;
   filtering the impure hydrofluoric acid to remove said particulate material;
   extracting said ionic impurities by contacting said impure hydrofluoric acid with anion and cation ion exchange material having an affinity for said ionic impurities to provide a purified effluent;
   monitoring the hydrofluoric acid that has contacted at least a portion of said ion exchange material for the presence of an ionic impurity;
   automatically stopping the contacting step when said monitoring step indicates an elevated level of said ionic impurity representative of exhaustion of at least a portion of said ion exchange materials; and
   automatically regenerating said cation exchange material with an ultrapure strong acid having metallic impurities no greater than 50 parts per billion per metal and automatically regenerating said anion exchange material with an ultrapure strong base having metallic impurities no greater than 50 parts per billion per metal, wherein said monitoring step comprises analyzing said hydrofluoric acid with an atomic absorption analyzer.

4. A method for purifying hydrofluoric acid, comprising the steps of:
   obtaining impure hydrofluoric acid containing particulate material and anionic and cationic impurities;
   filtering the impure hydrofluoric acid to remove said particulate material;
   extracting said ionic impurities by contacting said impure hydrofluoric acid with anion and cation ion exchange material having an affinity for said ionic impurities to provide a purified effluent;
   monitoring the hydrofluoric acid that has contacted at least a portion of said ion exchange material for the presence of an ionic impurity;
   automatically stopping the contacting step when said monitoring step indicates an elevated level of said ionic impurity representative of exhaustion of at least a portion of said ion exchange materials; and
   automatically regenerating said cation exchange material with an ultrapure strong acid having metallic impurities no greater than 50 parts per billion per metal and automatically regenerating said anion exchange material with an ultrapure strong base having metallic impurities no greater than 50 parts per billion per metal, further comprising the step, after said regenerating step, of again performing said contacting step.

5. The method of claim 4, wherein said regenerating step comprises contacting said cation exchange material with ultrapure sulfuric acid having metallic impurities no greater than 50 parts per billion per metal.

6. The method of claim 5, wherein said metallic impurities are no greater than 30 parts per billion per metal.

7. The method of claim 4, wherein said ion exchange material includes anion exchange material and wherein said regenerating step comprises contacting said anion exchange material with ultrapure ammonium hydroxide, having metallic impurities no greater than 50 parts per billion per metal.

8. The method of claim 7, wherein said metallic impurities are no greater than 30 parts per billion per metal.

9. The method of claim 4, wherein said monitoring step comprises analyzing for fluosilicate ion.

10. The method of claim 9, wherein said fluosilicate ion is detected by means of a conductivity sensor.

11. The method of claim 10, wherein said contacting step comprises passing said acid through an anion exchange material, wherein the conductivity of said acid is measured before and after passing through at least a portion of said anion exchange material, and wherein said contacting step is automatically stopped in response to a decrease in the difference between the measured conductivities.

12. The method of claim 4, wherein said monitoring step comprises analyzing said effluent for phosphorus.

13. The method of claim 4, wherein said monitoring step comprises analyzing said effluent for sodium cation.

14. The method of claim 4, further comprising the step of contacting the acid with silicon material to remove metal ions that will deposit on said silicon.

15. A method for purifying hydrofluoric acid, comprising the steps of:
   filtering said hydrofluoric acid to remove particulates;
   passing said filtered acid through a cation exchange material and an anion exchange material to remove ions therefrom;
   at least periodically automatically monitoring the acid that has passed through at least a portion of said cation exchange material for a level of cationic impurity representative of exhaustion of at least a portion of said cation exchange material;
   at least periodically automatically monitoring the acid that has passed through at least a portion of said anion exchange material for a level of anionic impurity representative of exhaustion of at least a portion of said anion exchange material;
   automatically interrupting flow of acid through said anionic or cationic exchange material at or prior to the time ionic breakthrough in such material occurs;
   while said flow is interrupted, regenerating said anionic or cationic exchange material;
   resuming said flow after said exchange material is regenerated;
   passing said acid from said cationic and anionic exchange materials through an ultrafilter and into a storage container; and
   monitoring the level of particulate impurities in acid that has passed through said anion and cation exchange materials and automatically passing said acid in said storage container through a filter until said particulates having a particle size of one micron or greater are substantially eliminated.

16. The method of claim 15, further comprising the step of contacting the acid with silicon material to remove metal ions that will deposit on said silicon.

17. The method for purifying hydrofluoric acid, comprising the steps of:
   obtaining impure hydrofluoric acid containing particulate material and at least one ionic impurity;
   filtering the impure hydrofluoric acid to remove said particulate material;

extracting said ionic impurity by contacting said impure hydrofluoric acid with ion exchange material having an affinity for said ionic impurity to provide a purified effluent, wherein said ion exchange material comprises anion and cation ion exchange material in separate beds and flow through the beds is sequential;

determining when a portion of the exchange capacity of said ion exchange material has been exhausted and automatically stopping said contacting step at that point;

automatically regenerating said ion exchange material while said contacting step is stopped; and automatically restarting said contacting step.

18. The method of claim 17, wherein said determining step comprises determining the volume of acid that has passed through said ion exchange material.

19. A method for purifying hydrofluoric acid, comprising the steps of:

obtaining impure hydrofluoric acid containing particulate material and at least one ionic impurity;

filtering the impure hydrofluoric acid to remove said particulate material;

extracting said ionic impurity by contacting said impure hydrofluoric acid with cation exchange material having an affinity for said ionic impurity to provide a purified effluent;

monitoring the hydrofluoric acid that has contacted at least a portion of said ion exchange material for the presence of said ionic impurity;

interrupting said extracting step when said monitoring step detects a level of said ionic impurity indicative of exhaustion of at least a portion of said cation exchange material; and regenerating said cation exchange material with ultrapure sulfuric acid having metallic impurities no greater than 50 parts per billion per metal; and again performing said contacting step.

20. A method for purifying hydrofluoric acid, comprising the steps of:

obtaining impure hydrofluoric acid containing particulate material and at least one ionic impurity, which impurity comprises fluosilicic acid;

filtering the impure hydrofluoric acid to remove said particulate material;

extracting said ionic impurity by contacting said impure hydrofluoric acid with anion exchange material having an affinity for said ionic impurity to provide a purified effluent;

monitoring the hydrofluoric acid that has contacted at least a portion of said ion exchange material for the presence of said fluosilicic ionic impurity by means of a conductivity sensor;

interrupting said extracting step when said monitoring step detects a level of said ionic impurity indicative of exhaustion of at least a portion of said anion exchange material;

regenerating said anion exchange material; and again performing said contacting step.

* * * * *